United States Patent [19]
Suzuki et al.

[11] Patent Number: 5,929,589
[45] Date of Patent: Jul. 27, 1999

[54] STEPPING MOTOR DRIVE AND A METHOD OF DRIVING SAME

[75] Inventors: Yuzuru Suzuki; Sakae Fujitani; Yoshiyuki Aono; Masahisa Etsuka, all of Shizuoka-ken, Japan

[73] Assignee: Minebea Co., Ltd., Nagano, Japan

[21] Appl. No.: 08/931,521

[22] Filed: Sep. 16, 1997

[30] Foreign Application Priority Data

Nov. 11, 1996 [JP] Japan .................................. 8-314317

[51] Int. Cl.⁶ .................................................. G05B 19/40
[52] U.S. Cl. ............................................................ 318/685
[58] Field of Search ................................... 318/685, 696, 318/807, 798, 799

[56] References Cited

U.S. PATENT DOCUMENTS

| | | | |
|---|---|---|---|
| 4,292,577 | 9/1981 | Cesarz et al. | 318/802 |
| 4,580,084 | 4/1986 | Takahashi et al. | 318/396 |
| 5,418,436 | 5/1995 | Apuzzo | 318/497 |
| 5,541,488 | 7/1996 | Bansal et al. | 318/801 |

*Primary Examiner*—William M. Shoop, Jr.
*Assistant Examiner*—Rina I. Duda
*Attorney, Agent, or Firm*—Staas & Halsey

[57] ABSTRACT

The invention is related to a stepping motor drive and a driving method thereof and presents a technology to constantly monitor the phenomenon of step out during the operation of the motor and automatically bring into action a restarting circuit when a step out occurs so that said motor having stepped out may be able to automatically restart, wherein the stepping motor drive is provided with a starting instruction designed to start/stop the stepping motor, a speed sensor or an index sensor designed to detect the rotation speed of said motor, means to detect the rotation speed of said motor from the output of said speed sensor, a rotation speed detection means by detecting the difference of rotation speed with the rated rotation speed, a speed judgment means designed to output signals when the rotation speed of said motor has fallen below the set reference speed, and a restarting pattern generating means designed to automatically increase gradually frequency for a prescribed time from the pull-in frequency of said motor to the desired frequency.

13 Claims, 10 Drawing Sheets

STEPPING MOTOR DRIVE AND A METHOD OF DRIVING SAME

BACKGROUND OF THE INVENTION

1. Field of the Invention

This invention relates to a recording disk drive technology applied to an information recording device wherein a disk recording medium is rotated for information exchange, and in particular to a recording disk drive and driving method thereof for an information recording device wherein a stepping motor is used for a driving source for rotating the disk recording medium.

2. Description of the Prior Art

For writing and reading information into and from a disk-type information recording media, i.e., so-called floppy disks used in word processors and personal computers, a floppy disk drive (hereinafter referred to as "FDD") is used. So far a brushless DC motor has been used as a spindle motor rotating the disk in the FDD, The characteristics and reliability of the brushless DC motor is satisfactory as the disk drive motor. However, the necessity of a rotor position detector and a speed detector necessarily renders the motor drive circuit expensive. In other words, it leads to make the drive circuit be equipped with a rotation speed feedback control system in order to assure accuracy of rotation, and as a result the circuit construction becomes so complicated not to comply with a demand for manufacturing cost reduction. For this reason, developments of a low cost stepping motor has been studied for a spindle motor driving the recording media.

On the other hand, since the stepping motor is regarded as a permanent magnet-type synchronous motor in a broad sense, a fatal problem called "step out" is inherent in it. In particular, a rated rotation speed is often used in a pull out area of the motor in such an information recording device as to make use of a flywheel effect caused by an increased inertia of the rotating part and thereby improve accuracy of rotation, in which case said motor cannot restart forever even if disturbance of load is removed.

As a countermeasure, it is needed to adopt any circuit for restarting the motor when a step out occurs for some cause during operation.

Needless to say, phenomenon of a step out does not occur in a configuration in which a traditional brushless DC motor is used. Even if the motor stops, only removal of the disturbance of load automatically leads to its restarting. Then, a restarting circuit as mentioned above is unnecessary.

A stepping motor as described above can easily be driven with a desired rotation speed by use of a low-cost digital circuitry. However, in order to assure accuracy of its rotation speed, an inertia of a rotating part of the motor is increased. As a result, it will cause a fatal problem that the motor never restarts once a step out occurs for some cause because the rated rotation speed shifts from a pull-in area to a pull-out area of the motor.

SUMMARY OF THE INVENTION

In view of such a situation, this invention presents a stepping motor drive and its driving method wherein a step out phenomenon is constantly monitored during operation of the motor and the pull-in circuit is automatically switched on when the step out occurs, whereby the stepped-out motor may automatically be able to pull in.

This invention provides a stepping motor drive making a start instruction to start/stop the motor and a rotation speed instruction to specify a rotation speed of the motor, and the stepping motor drive is equipped with the followings: a speed sensor or index sensor to detect the rotation speed of the motor; means of detecting the rotation speed of the motor from outputs of the speed sensor or index sensor, or a rotation speed detection means which detects difference between the rotation speed and a rated rotation speed; a speed judgment means to output any signals when the rotation speed of the motor falls below a reference speed; and a pull-in pattern generating means which automatically increases gradually the frequency during a required length of time from the pull-in frequency of said motor to a desired frequency in accordance with outputs of the speed judgment means. In the stepping motor drive, the rotation speed instruction is replaced by the pull-in pattern generating frequency depending on the output of the speed judgment means.

It is possible to monitor constantly phenomenon of step-out during operation of the motor, and when a step-out occurs it is possible to switch on automatically the pull-in circuit to pull in said motor. In particular, if a plurality of restarting frequency patterns are formed in a configuration of the restarting pattern generation means to generate a plurality of frequency patterns by switching, it is possible to reduce the probability of failures of restarting by use of any appropriate pattern in case of high frequency of step-out occurrences per unit length of time.

In case of successive failures of restarting even as a result of several successive attempts to restart, mechanical damages are possible. In such a case, in order to prevent abnormal heating and burning of the motor and the drive circuit, it is possible to protect the motor by suspending the excitation of the motor and to output externally signals of its abnormal condition.

BRIEF DESCRIPTION OF THE DRAWINGS

FIG. 1 (a) and (b) are both bird's-eye views of a floppy disk drive, one example of information recording devices.

DESCRIPTION OF THE PREFERRED EMBODIMENTS

Figure 1A:
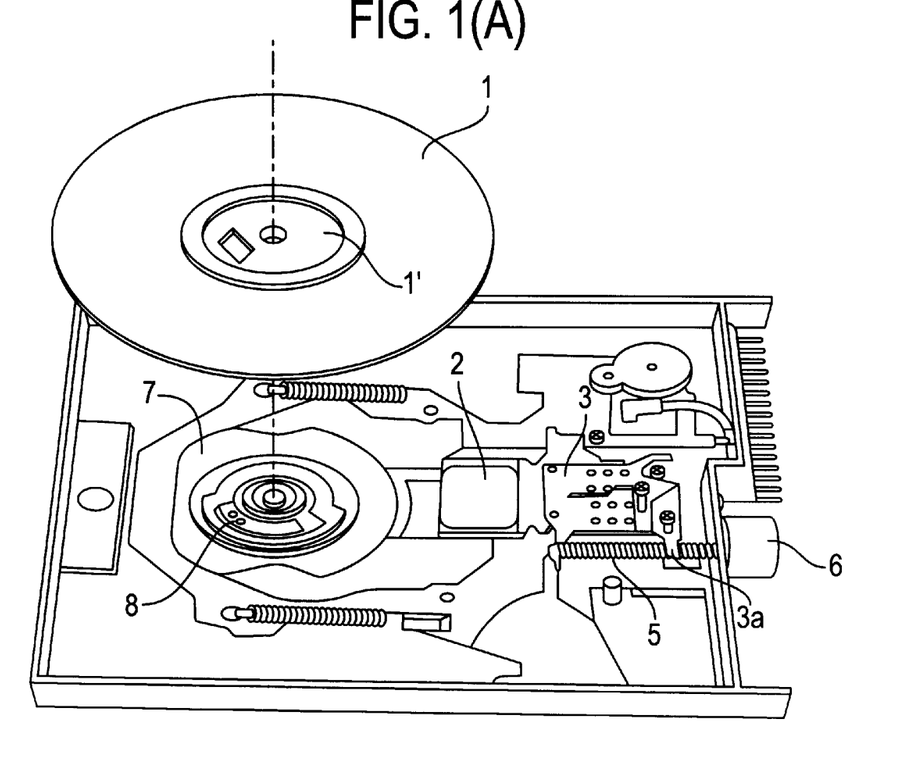
Figure 1B:
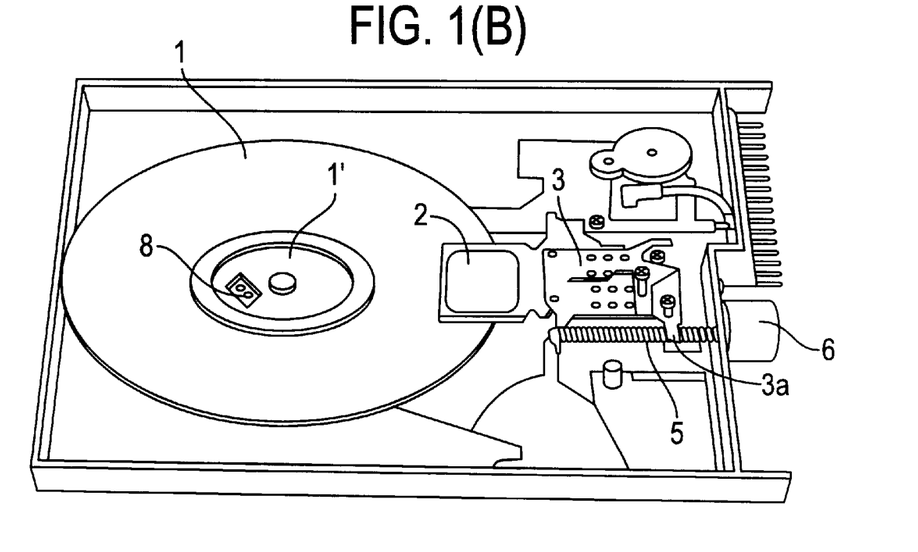

As an example of the information recording device according to this invention, a 3.5 inch floppy disk drive will be described with figures. FIGS. 1(a) and 1(b) are schematic figures excerpting only the necessary parts for the convenience of description of this invention. FIG. 1(a) is a schematic figure showing its appearance when the disk is removed, while FIG. 1(b) shows its appearance when the disk is mounted. The numeral 1 is the disk, of which both sides are coated with magnetic fine powder, and in the center a saucer-like ferrous chucking hub 1' with two holes is inserted. The whole disk 1 is housed in a plastic case (not shown) in order to protect the recording medium surface and to improve its portability.

The denotation 2 is a magnetic head, which accesses information on the disk 1. In other words, the magnetic head 2 in contact with the disk 1 reads the information recorded on the disk in the form of magnetic variations of magnetic fine power. As for writing, on the other hand, magnetic changes created on the magnetic fine power on the disk 1 are the means of writing information. In other words, the magnetic head 2 reads and writes information on the disk 1 with a coil contained therein.

The numeral 3 is a part called "head carriage" with a magnetic head 2 mounted thereon, and the magnetic head 2 is mounted at its top end. The head carriage 3 is a mechanism designed to move the magnetic head 2 in a straight line to a suitable position (track) on the disk 1 and comprises an actuator motor 6 and a screw 5 which converts the rotary movement thereof into a linear movement. For this purpose, a nut 3a mates with a groove of the screw 5 so that the rotation of the screw 5 results in a linear movement of the whole head carriage. In this way, it is possible to move the magnetic head 2 to any desired track position of the disk 1 according to the position instruction consisting of a number of pulses given to the actuator 6.

The numeral 7 is a spindle motor that rotates the disk 1, and in this invention a stepping motor is adopted. A chucking mechanism 8 is mounted on the top end of the rotating shaft to hold stably and rotate the ferrous chucking hub 1 at a center portion of the disk 1. As a result, the disk 1 is clamped by the chucking mechanism 8 of the spindle motor 7 to continue rotating stably.

Figure 2:
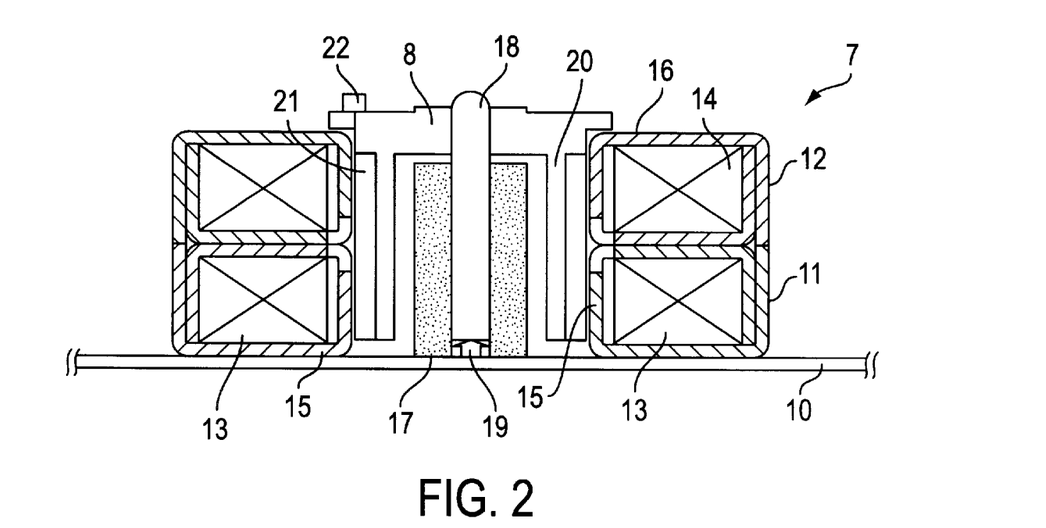
FIG. 2 is a cross section view of an inner rotor-type stepping motor.

To start with, a stepping motor used as the spindle motor for driving the disk in an embodiment of this invention will be described. FIG. 2 shows a cross section view of an inner rotor-type stepping motor, and in particular shows the construction of a 2-phase clawpole-type stepping motor which is advantageous in terms of cost. The stepping motor is mounted on a base 10, and two stator yokes 11 and 12 are arranged one above the other. Each stator yoke 11 and 12 houses a stator coil 13 and 14 respectively and has a cylindrical space in each center portion. Each cylindrical wall is equipped with stator poles 15 and 16.

At the center of the cylindrical space, a bearing 17 is erected from the base 10. A rotary shaft 18 is supported rotatably by this bearing 17 having a thrust bearing 19 at the bottom thereof. A cup-form rotor 20 is fixed to the top end of the rotary shaft 18. A rotor magnet 21 is fixed to an outer surface of the rotor 20 facing the stator poles 15 and 16. The upper part of the rotor 20, in other words the bottom part of the cup-form is equipped with a chucking mechanism 8 which holds the chucking hub 1' of the disk 1. The numeral 22 is a pin fitting into the hub hole of the disk 1.

Figure 3:
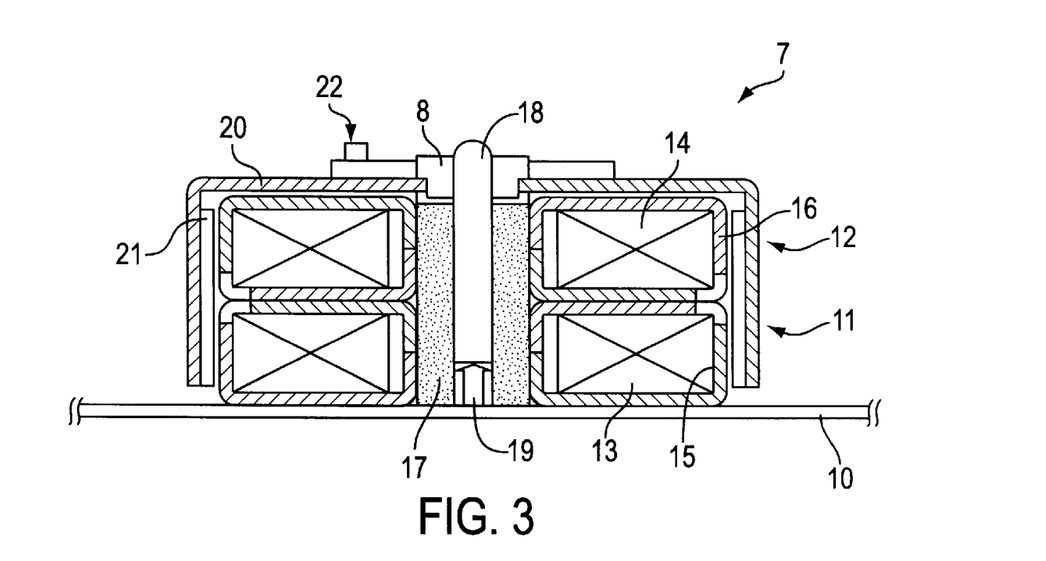
FIG. 3 is a cross section view of an outer rotor-type stepping motor.

FIG. 3 is a cross section view of an outer rotor-type stepping motor, the construction of which will be described below. On identical parts with those shown in FIG. 2, identical denotation will be marked. As referred to FIG. 2, the stepping motor has two stator yokes 11 and 12 disposed one on top of the other on the base 10. Each stator yoke 11 and 12 has a stator coil 13 and 14 inside respectively, and has a cylindrical space in each center portion. Within this cylindrical space, a bearing 17 is erected on the base, and this bearing 17 bears a rotary shaft 18 in such a way as to assure a complete freedom of rotation.

The stator poles 15 and 16 are formed on the external side walls of the stator yokes 11 and 12. A cup-form rotor 20 is fixed to the top end of the rotary shaft 18, and a rotor magnet 21 is formed on the part of the rotor 20 facing the stator poles 15 and 16. A chucking mechanism 8 and a pin 22 are likewise formed on the upper part of the rotor 20. The above is referring to inner rotor-type and outer rotor-type stepping motors, but a category of a motor in the invention is not limited to them and any permanent magnet-type motors will be applicable. For example, a permanent magnet-type synchronous motor shown in Japanese Patent Application Hei 7 (1995) 313861 will do the job.

Figure 4:
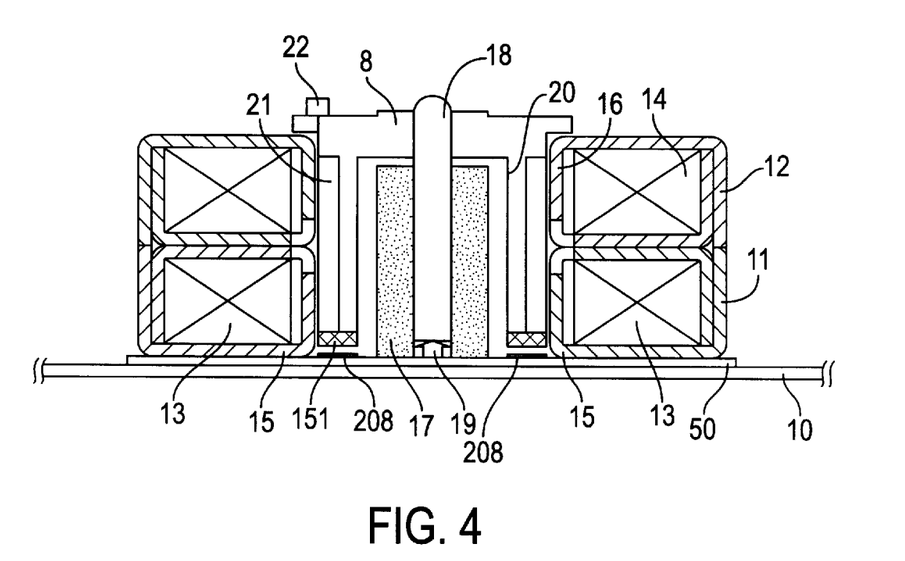
FIG. 4 is a cross section view of another inner rotor-type stepping motor.
Figure 5:
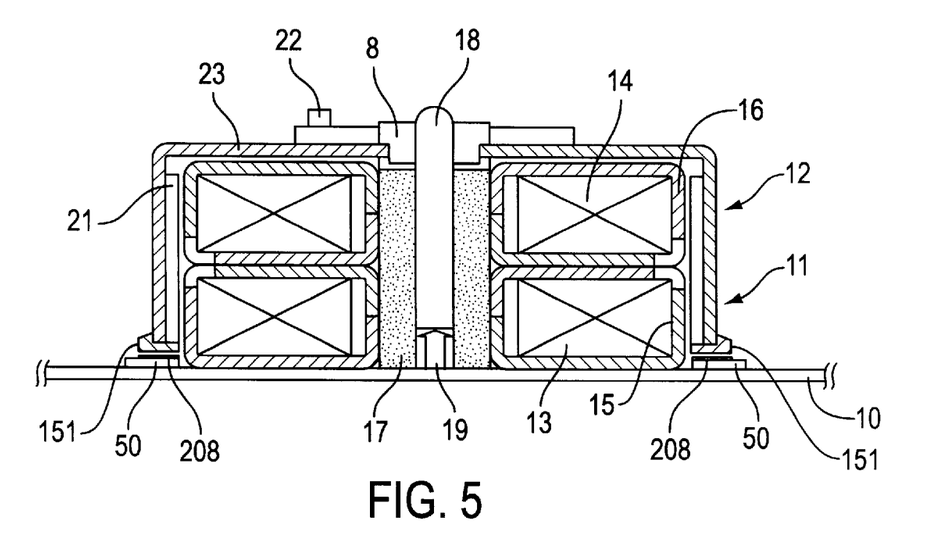
FIG. 5 is a cross section view of another outer rotor-type stepping motor.

Furthermore, examples of speed sensor integrated-type motors are shown in FIGS. 4 and 5 where each speed sensor (a frequency generator: FG) is integrated to an inner rotor-type motor and an outer rotor type shown respectively. On the parts identical with those shown in FIGS. 2 and 3, identical codes are marked.

In FIG. 4, a thin electrical circuit board 50 is inserted between the base 10 and the lower stator yoke 11. A detection coil 208 is formed on said electrical circuit board 50 by an etching method. A speed detection magnet 151 is disposed on the lower ends of the rotor magnet 21 and the rotor 20 and is positioned to face said detection coil 208 axially across a minute air gap. As the rotary shaft 18 of the motor rotates, the speed detection magnet 151 rotates at the same speed. As a result, in the detection coil 208 facing the speed detection magnet 151, a minute AC voltage of a frequency corresponding to the rotation speed is generated. Incidentally, a principle of power generation of the frequency generator, form of the detection coil 208, and form and magnetization of the speed detection magnet 151, etc. are identical to those of the general frequency generator, then the description thereabout is omitted here.

FIG. 5 shows an outer-type rotor motor where a speed sensor is integrated to the motor. There is no difference between FIG. 5 and FIG. 4. except for the difference of an inner rotor-type motor with an outer rotor-type motor.

A speed sensor integrated-type motor means a motor where a speed sensor utilizes a constituent element of the motor and a coupling mechanism is not applied to a rotary shaft of the motor. (In FIG. 4 and 5, the rotary shaft 18 is shared by the speed sensor and the motor.) In this case, as a further measure of integration, a mold technology is used to mold integrally the speed detection magnet 151 and the rotor magnet 21 of the motor and magnetize the necessary parts thereof.

Now, a driving method of the spindle motor 7 shall be described. When said motor is used to drive the disk 1 at the rated rotation speed (to access information), the same driving method as to drive normally the stepping motor can be available. In other words, it is enough to give to the stator coils 13 and 14 of said motor excitation signals of an excitation frequency determined by the rotation speed, number of steps and excitation mode. In giving such signals, it is enough to switch excitation signals to said stator coils at a suitable timing by means of transistors so that a sequence of rotating magnetic fields of a desired speed may be obtained (for details, see the motor driving circuit 102 of FIG. 6 and time chart of FIG. 7 mentioned below).

However, particularly in an information processing device in which an inertia of a rotating part is increased to enhance the flywheel effect for improving rotation accuracy, the rated rotation speed is often used in the pull out area of the motor. In such a case, said motor cannot pull in, and once a step-out has occurred for some cause, the motor can never restart forever as long as the situation remains unchanged even if disturbance of load is removed. This is a fatal shortcoming.

Figure 6:
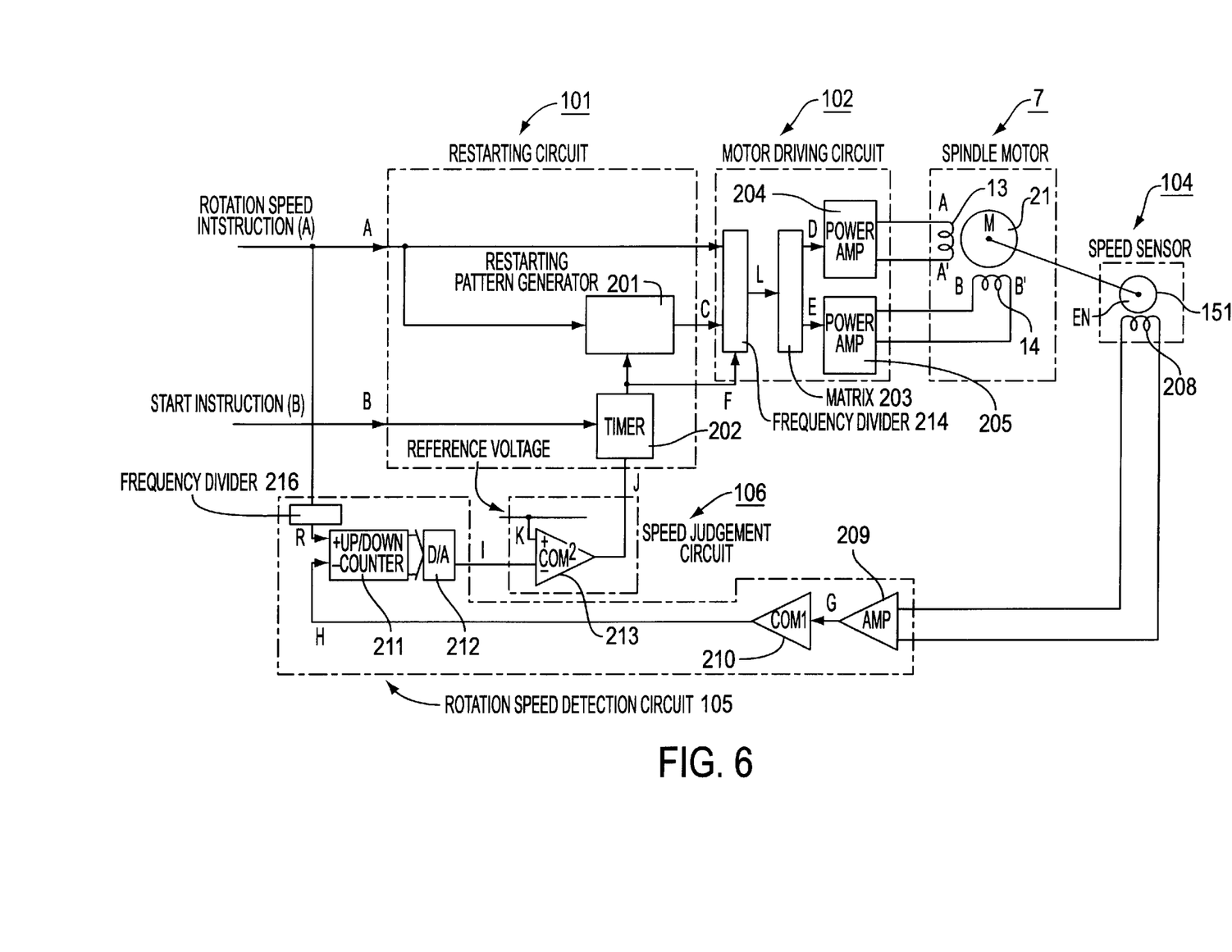
FIG. 6 is a block diagram relating to the first embodiment of this invention.

FIG. 6 shows the first circuit embodying this invention. The constituent of this first circuit is composed of 6 main blocks of a restarting circuit 101, a motor driving circuit 102, a spindle motor 7, a speed sensor 104, a rotation speed detection circuit 105 and a speed determination circuit 106. The function of the restarting circuit 101 is very notable. After receiving a step-out signal (the step-out signal itself results from an output J of the speed judgment circuit 106 described below), the restarting circuit 101 automatically starts the restarting pattern generator 201 to generate a frequency pattern suitable for restart of the spindle motor 7 (the detailed pattern will be described later). The output C of the restarting pattern generator 201 is supplied to the motor driving circuit 102.

Figure 11:
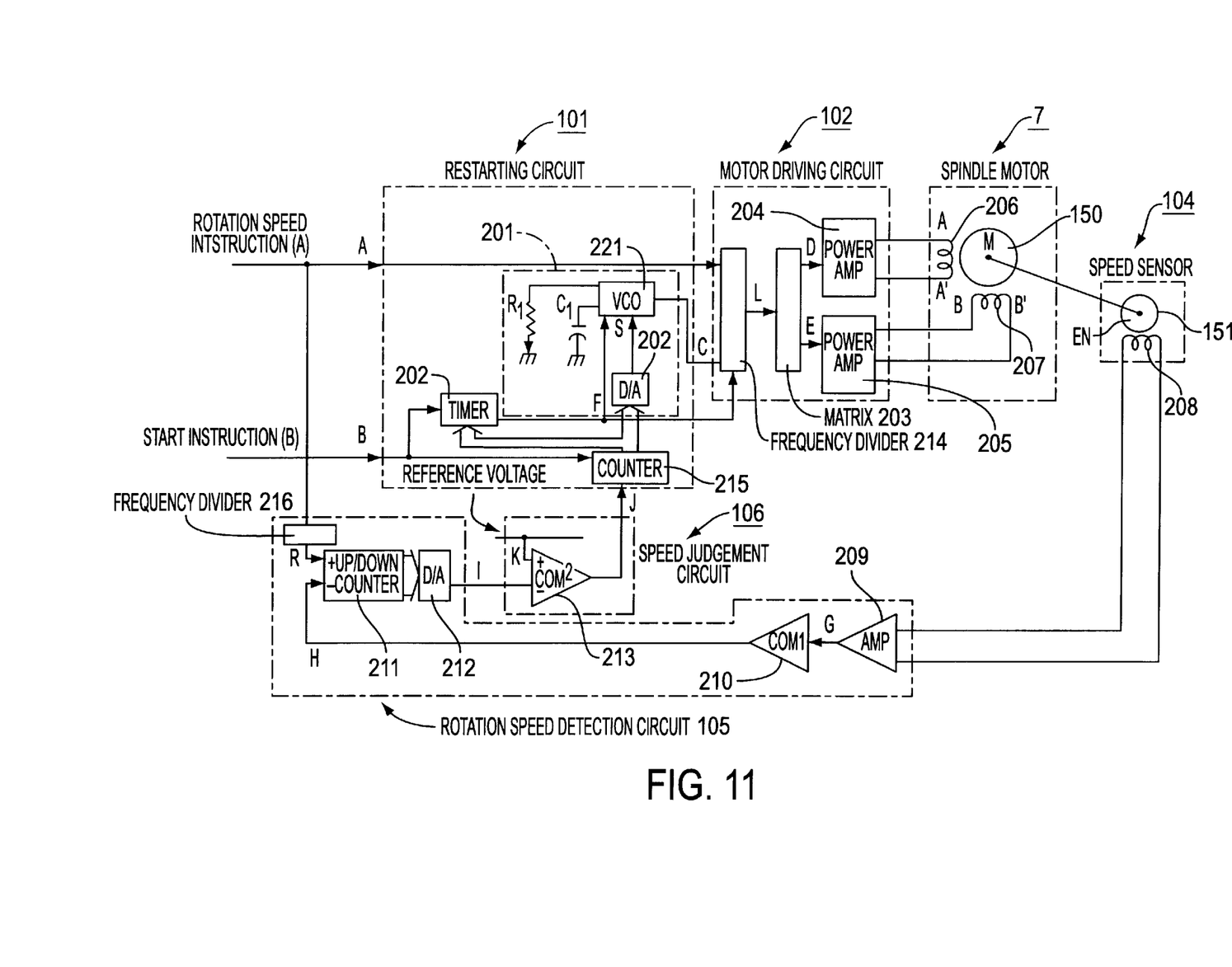
FIG. 11 is a block diagram showing the third embodiment of this invention.

In the meanwhile, the restarting time is determined by a timer 202, and while said timer 202 is turned "ON" (during the restarting time), the frequency supplied to the spindle motor 7 is switched from the rotation speed instruction A to the output frequency C of the restarting pattern generator 201. The restarting pattern generator 201 of this embodiment stores necessary patterns in a ROM (read only memory) and reads such patterns. However, a configuration with a VCO (voltage control oscillator) as shown in FIG. 11 can be available. (The circuit illustrated in FIG. 11 will be described later). Moreover, the configuration of the restarting circuit may make use of not only hardware but also mathematical formula based on software, and the restarting circuit 101 mentioned in this invention is a generic name of these means.

The motor driving circuit 102 of this embodiment is a standard motor driving circuit to drive a 2-phase stepping motor in bipolar system. In the circuit, a frequency divider 214 divides a frequency of signal the speed instruction A during normal operation or the output C from the generator 201 at the time of restarting to output a signal L to a matrix circuit 203, and then the matrix circuit 203 outputs signals D and E to generate 2-phase excitation voltage wave forms on power AMPs 204 and 205 at a suitable excitation timing in order to supply necessary power to the spindle motor 7.

As already described in detail in respect of its structure, the denotation 7 represents a spindle motor for driving a disk, to put it concretely, a 2-phase clawpole-type stepping motor in this embodiment. Said spindle motor 7 is schematically represented by a A-phase coil 13 (A–A'), a B-phase coil 14 (B—B) and a rotor magnet 21.

The number 104 denotes a speed sensor connected to the shaft of said spindle motor 7 by means of a coupling and others, and it is designed to sense the rotation speed of said spindle motor. In this invention, it is the frequency generator (already described in FIGS. 4 and 5 as for a motor-integrated type), which is an AC generator outputting a frequency proportionate to the rotation speed of the spindle motor 7. The detection output is taken from the detection coil 208. Furthermore, the figure schematically shows the speed sensor 104 by the detection coil 208 and the speed detection magnet 151.

The number 105 shows a rotation speed detection circuit, which amplifies a minute output voltage of said speed sensor 104 and forms it into a pulse wave form H. On the other hand, a frequency divider 216 divides a frequency of the rotation speed instruction A to create pulse wave form R (for example, to be divided into 64 segments so that the divided frequencies of rotation speed instruction A may be equal to a frequency of said pulse wave form H during the rated rotation time), and after comparing the pulse wave forms H and R, the resultant is converted into analog voltage. There are two kinds of technologies applied to the rotation speed detection circuit: a method of detecting a real rotation speed of the motor and that of detecting difference of a rotation speed of the motor with the rated rotation speed. This embodiment is based on the later method of detecting difference of the rotation speed with the rated rotation speed.

In specific terms, a detected output of the detection coil 208 is amplified by AMP 209 and further converted by the comparator 210 into the pulse wave H.

In an UP/DOWN counter 211 to receive two wave forms, that is, the amplified pulse wave form H and the pulse wave form R from the rotation speed instruction A via the frequency divider 216, one wave form is deducted from the other wave form. A resultant accumulated value in the counter 211 (this corresponds to the difference of rotation speed between the rated rotation speed and the actual rotation speed of the motor) is converted into analog voltage I with a D/A converter 212.

In a speed determination circuit 106, a comparator 213 compares said analog voltage I with a previously set reference voltage K and then outputs an output J (in pulse form) at the moment when the analog voltage I exceeds the set reference voltage K. The pulse of the output J is an signal corresponding to the outbreak of a step-out. Incidentally, the value of the previously set reference voltage K is one corresponding to the rated rotation speed, but it needs not necessarily to be the rated rotation speed itself. In other words, this set reference voltage K must be determined by taking into account not only the rated rotation speed but also the characteristics of the motor and loads (including inertia of the disk and others) to assure that the outbreak of step out would be detected without failure. In this embodiment, this value K was set at a half of the rated rotation speed.

The adoption of the configuration and driving method as mentioned above for driving the spindle motor 7 assures the detection of step out of said motor. Whenever any step-out occurs, the rotation speed instruction A is automatically switched to the output C of the restarting pattern generator 201. Accordingly, said motor can be restarted certainly in a short period of time.

Figure 7:
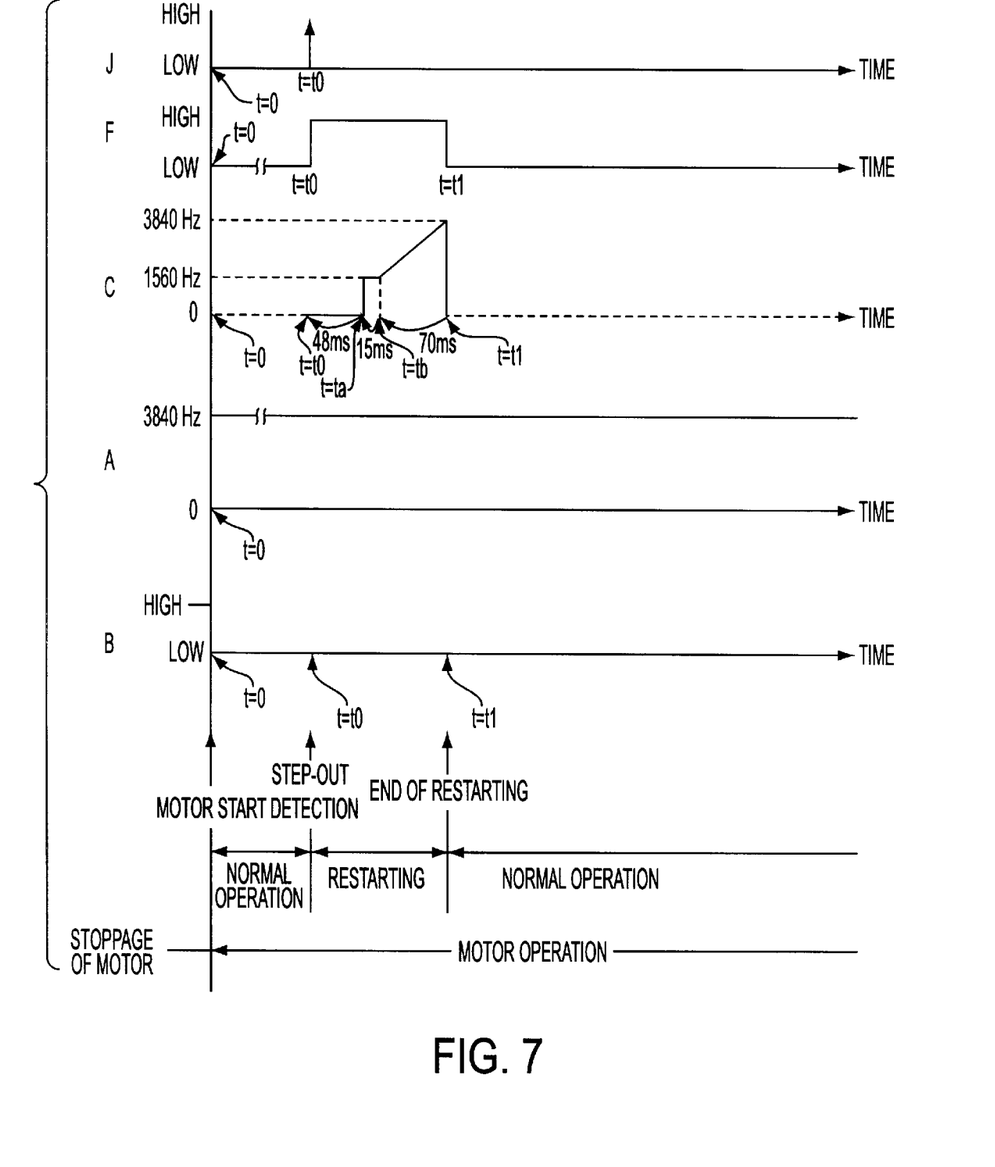
FIG. 7 is a time chart relating to the first embodiment.

FIG. 7 shows a timing chart for each of the signals A, B, C, F and J in the restarting circuit 101. In the figure, the time range t>0 represents when the motor is in operation, the time period t=0~t0 corresponds to the normal operation condition, the period t=t0~t1 shows the restarting condition, and the range t>t1 again represents the normal operation condition, the moment t=0 indicates the startup of the motor, the time t=t0 shows the detection of a step-out (beginning of the restarting) and the time t=t1 indicates the moment of end of the restarting. In the figure, a signal J is an output of the speed judgment circuit 106 and the moment of the step-out is shown by t=t0

The timer 202 receives the signal J as a trigger signal (at t=t0 in the figure) to output a signal F and stops operating to cease the output at t=t1. The timer "ON" time t1—t0 corresponds to the length of time while the restarting circuit is operating.

The signal C indicates the frequency patterns actually generated by the restarting pattern generator 201 and their generation timing. The vertical axis represents frequencies. It is preferable to use such frequency patterns as to assure reliable restarting and shorten restarting time. In this embodiment initially (ta~tb) a very low constant frequency of 1,560 Hz is applied to excite at a low speed, and then within a time span of 70 ms (T=tb~t1) the frequency is linearly increased from 1,560 Hz to 3,840 Hz. And the timing is synchronized with the timer "ON" time of the signal F. Incidentally, the frequency of 3,840 Hz corresponds to the frequency of operation at the rated operation speed of 300 rpm. It is needless to say that the rotation speed of the spindle motor is proportional to said frequencies.

The frequency patterns in the invention are not limited to those of this embodiment, and it is possible to use such frequency patterns as to have no DC excitation (t=0~ta in FIG. 7) or have steps-shaped changes in frequency provided that they assure a reliable restarting by gradually increasing the pull-in frequency of the spindle motor 7. And the following frequency pattern is available in order to improve the stability of frequency in the neighborhood of the rated rotation speed. That is, the frequency is gradually increased at the initial stage of restarting and then once reduced in the neighborhood of the rated rotation speed, subsequently synchronized to a frequency corresponding to the rated rotation speed. The combination of these patterns can of course be used.

As a rotation speed instruction, the signal A is always supplied to the restarting circuit 101, with a frequency corresponding to the rated rotation speed of the motor (3,840 Hz in case of this embodiment). However, as mentioned above, during the restarting time it is forcibly cut off on the circuit, and the output C of the restarting pattern generator 201 will instead serve as the rotation speed instruction for the motor. Incidentally, the vertical axis of the signal A in FIG. 7 represents frequencies as well as that of the signal C.

Figure 8:
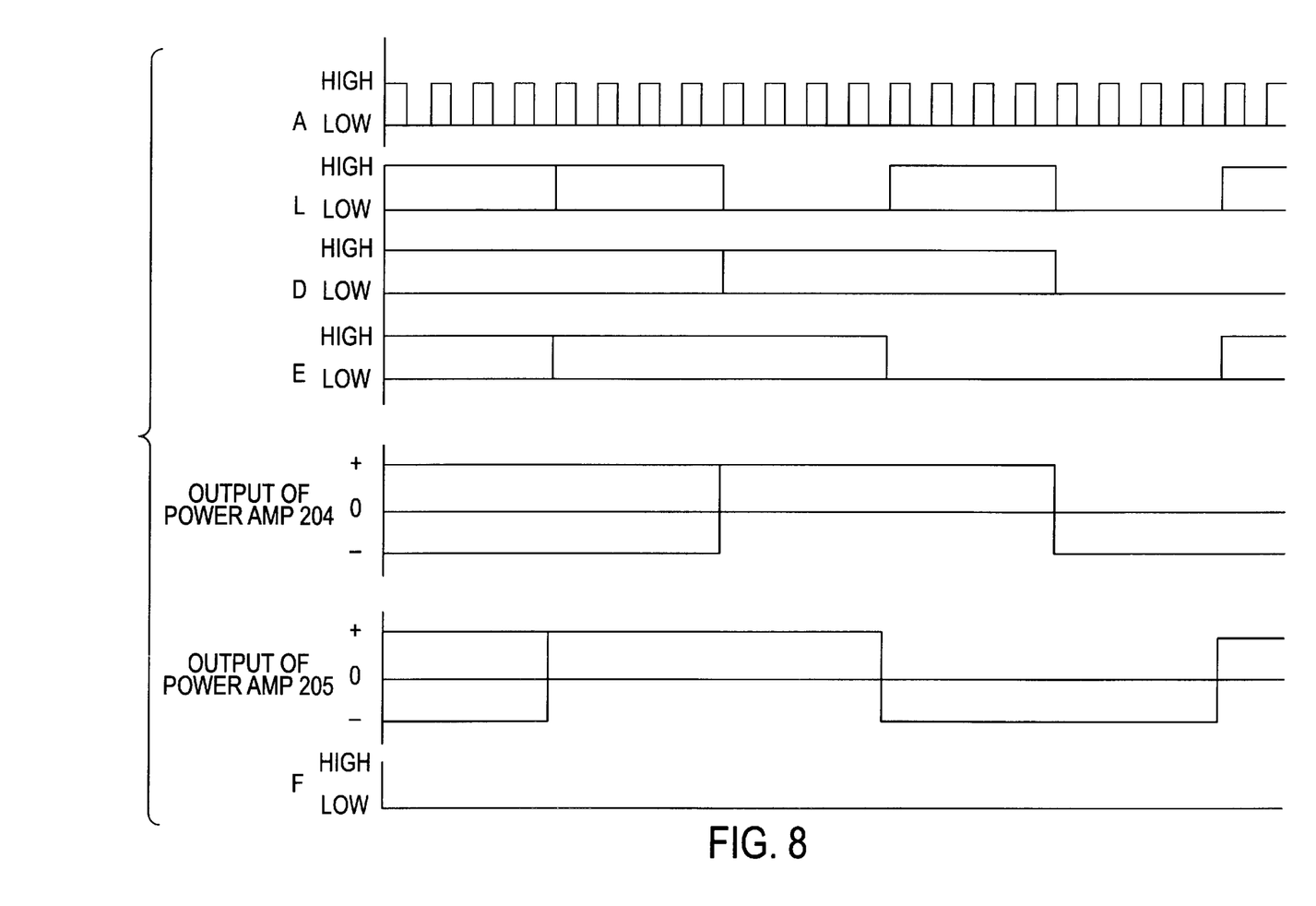
FIG. 8 is another time chart relating to the first embodiment.

The signal B is a starting instruction signal for the motor. Said signal is "LOW" during operation and is "HIGH" during stoppage. Since the restarting circuit is operating, as a matter of course, said signal B is "LOW." Here, The time t=0 shows the starting point of the motor. The rotation speed instruction A during the normal state of the motor driving circuit 102 (while the restarting circuit is not operating), the timing chart is shown in FIG. 8 as to the signals L, D, E, F and the output of the power AMP 204 and 205 within the motor driving circuit. As mentioned above, this motor driving circuit is used in the bipolar driving system of a 2-phase stepping motor.

The signal A is, as described above in conjunction with the rotation speed instruction of the rated rotation speed, a pulse train of 3,840 Hz. The signal L is the output of the frequency divider 214 and corresponds to the frequency divided to ⅛ of that of the signal A. The frequency of signal D is a half of that of the signal L. The frequency signal E is also a half of that of the signal L but there is phase difference of 90° in its electrical angle between the signal E and the signal D. In this figure the signal E is 90° ahead of the signal D.

The output of the power AMP 204 operates with the same timing as that of the signal D. However, because of bipolar operation, when the signal D is "LOW", it generates a negative voltage (in the direction of excitation of A' to A in the A-phase coil), and when the signal D is "HIGH" it generates a positive voltage (in the direction of excitation of A to A' in the A-phase coil). The power AMP 205 outputs in the same way as the power AMP 204. In other words, when the signal E is "LOW", it generates a negative voltage (in the direction of excitation of B' to B in the B-phase coil), and when the signal E is "HIGH", it generates a positive voltage (in the direction of excitation of B to B' in the B-phase coil). The phase difference between the power AMP 204 and the power AMP 205 is also 90° in electrical angle.

The circuit used in this invention is not limited to the embodiment shown in FIG. 6. For example, the speed sensor 104 used in this embodiment is a frequency generator with a resolution of 60 ppr. The speed sensor 104 can be replaced by whatever outputs a physical quantity proportionate to the rotation speed. Further, any type of sensor generating analog voltage can be also used. In this case, the rotation speed detection circuit 105 must of course be exchanged for an analog type.

In the 3.5 inch FDD, an index sensor for detecting an absolute position of a rotor is incorporated in the motor (not shown in FIGS. 1–3), and the index signals outputted at a fixed position once in every rotation can be used to detect the rotation speed of the motor. In this case, the frequency of the speed sensor 104 in FIG. 4 drops (to ¹⁄₆₀ in this embodiment), and in response thereto the frequency division ratio of the frequency divider 216 within the rotation speed detecting circuit 105 must be increased (60 times). Only by taking such measures, the configuration of FIG. 4 can be applied as it is. As a result, a motor incorporating the speed sensor 104 therein can be used.

Referring to the rotation speed detection circuit 105 and the speed determination circuit 106, other means than what are described above can be used. For example, as a single circuit having a function of these two combined circuits, it is possible to adopt a circuit obtained by only omitting the expensive D/A converter 212 and the comparator 213. The time when a carry signal (not shown) of the UP/DOWN counter 211 shoots up (when the number of positive pulses of the UP/DOWN counter exceeds the number of negative pulses, the count value is added up to be overflowed finally) may be linked with the step-out of the motor. In other words, the output of the carry signal of the counter 211 may be used as the output J of the speed determination circuit 106.

Using a retriggerable one-shot multi-oscillator with the duration of one-shot Ta set somewhat longer than the cycle T of the speed sensor during the rated rotation speed (for example, 1.1T<Ta<1.5T) as a speed judgment circuit 106, the triggering operation continues in the normal operating condition (not stepped out). Because successive trigger pulses will be inputted before said one-shot multi-oscillator ends operating. However, a step-out of the motor will reduce the speed of the motor and therefore the cycle T of the trigger pulses will gradually elongate (this occurs in response to the elongation of the cycle of the speed sensor 104), and at the time of T>Ta the one-shot multi-oscillator outputs once an end pulse. This end pulse can be used as the output signal of the speed judgment circuit 106, or a software can be used in its place.

Figure 9:
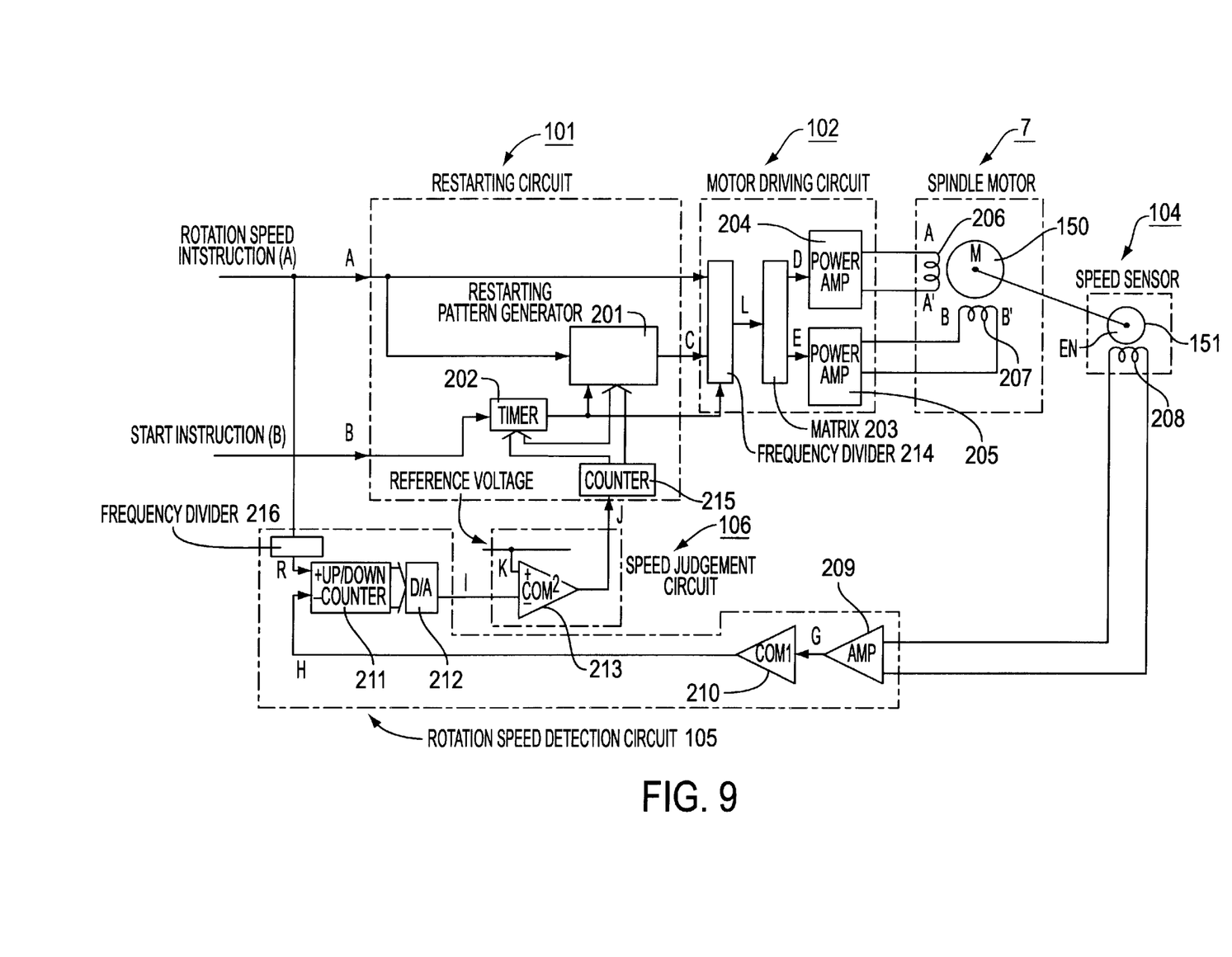
FIG. 9 is a block diagram showing the second embodiment of this invention.

The second embodiment is shown in FIG. 9. The difference with FIG. 6 is limited to the circuit of the restarting circuit 101. The rest being identical the description of overlapping parts will be omitted. This embodiment is characterized in that a plural number of frequency patterns for use at the restarting time are contained in the restarting pattern generator 201 (a ROM is used like in FIG. 6), and when the frequency of step-out is high, the frequency pattern used in each occasion can be changed to another. In other words, this embodiment can address to the situation in which the motor does not restart in spite of the fact that the restarting circuit worked (the so-called failure of restarting).

In specific terms, when the output J of the speed judgment circuit 106 is inputted into the counter 215 and the value of counts per unit length of time (in FIG. 10 the timer to determine this unit length of time is not shown) of the counter 215 is increased, the attempt to restart is considered to have failed. Therefore, by changing the time of the restarting pattern generator 201 and the timer 202 in response to said count value, it is possible to reduce the probability of failed starting at the time of second or third restarting.

Figure 10:
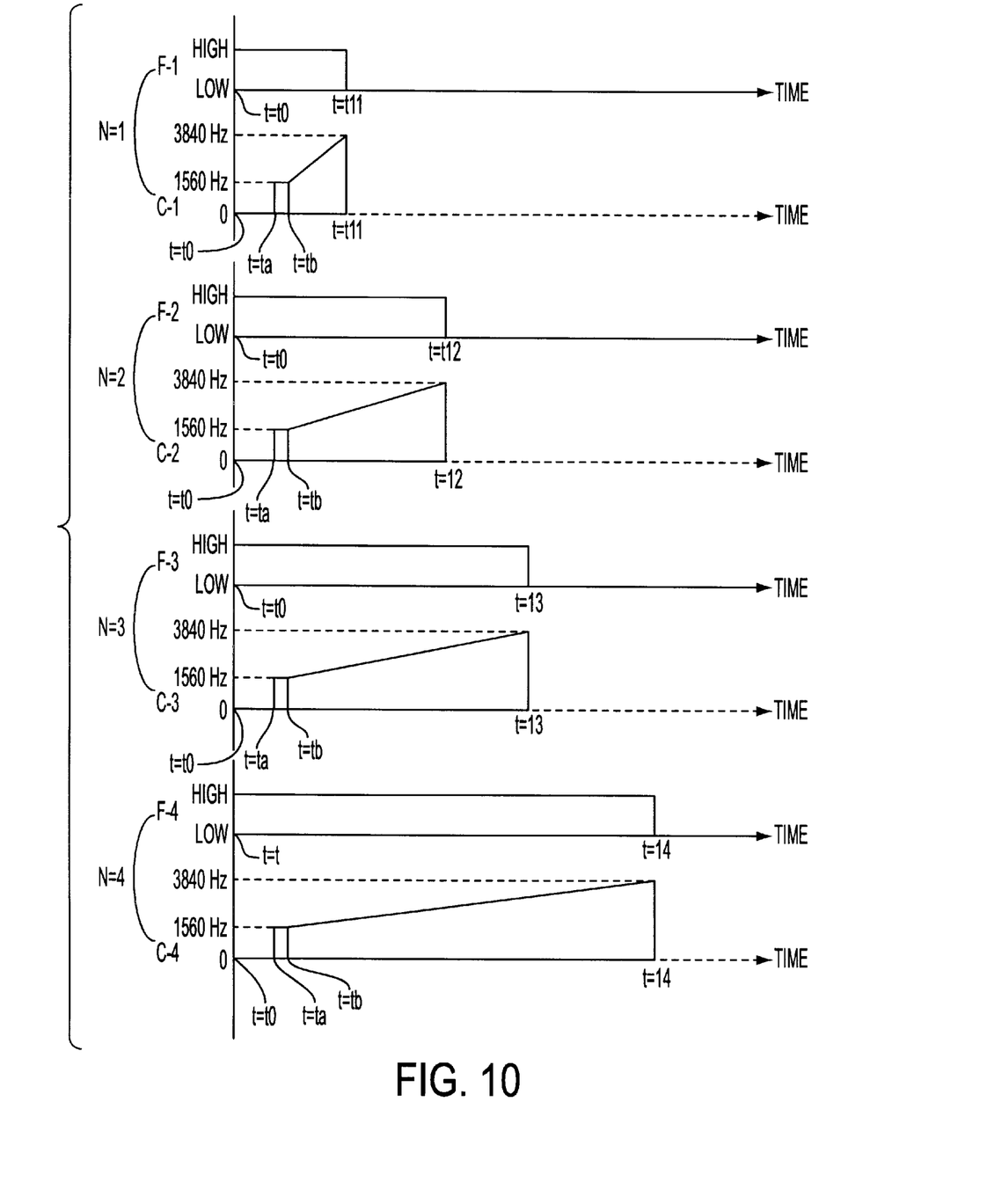
FIG. 10 is a restarting pattern chart relating to the second embodiment.

FIG. 10 shows an embodiment wherein the restarting pattern generator 201 contains a plurality of frequency patterns. In the figure, the "N=1" indicates the frequency pattern at the time of restarting, the "N=2" shows that at the second restarting, the "N=3" represents that at the third restarting and the "N=4" indicates that at the fourth restarting. As the number of N increases, the time for restarting is elongated and the average inclination of frequency is made gentler(for an extended pull-in time at the time of restarting) so that reliable starting may be expected.

In this embodiment, each of the DC excitation time ta, the low-speed excitation time ta-tb and the low-speed excitation frequency 1,560 Hz. is the same as that in the previous embodiment. These conditions may be changed successively. And in the figure the upper limit of number of restarting N is 4, which means that the case of failed restarting even at N=4 is not anticipated. In such case, it is possible that the driving system including the spindle motor may have developed a mechanical trouble, and therefore it is necessary to stop the attempt to restart and prevent any abnormal heating and burning of the motor. In this embodiment, all attempts to restart at N=5 are to be suspended. (See embodiment 4) FIG. 11 shows the third embodiment wherein a plurality of frequency patterns may be generated. As mentioned above, this embodiment is characterized in that the restarting pattern generator 201, a part of the restarting circuit 101, comprises a VCO 221, a resistance R1, a capacitor C1 and a D/A converter 220. The difference with the embodiment shown in FIG. 9 is that the restarting pattern generator 201 uses the VOC to generate changeable frequency patterns instead of a ROM containing a plurality of frequency patterns. That is, there happen changes in the output voltage of the D/A converter in response to the frequency of restarting and such changes are added to the input voltage of the VCO so that the frequency pattern of the VCO may change.

Thus an embodiment wherein a plurality of frequency patterns can be generated in this manner may be used. Incidentally, the VCO is a oscillator that outputs frequencies proportionate to the analog input voltage, and the resistance R1 and capacitor C1 have the initially set constants in order to determine the basic frequency of said oscillator. Of course, a configuration wherein changes made in the constants of these resistance R1 and capacitor C1 in response to the output of said D/A converter lead to changes in the frequency patterns.

Figure 12:
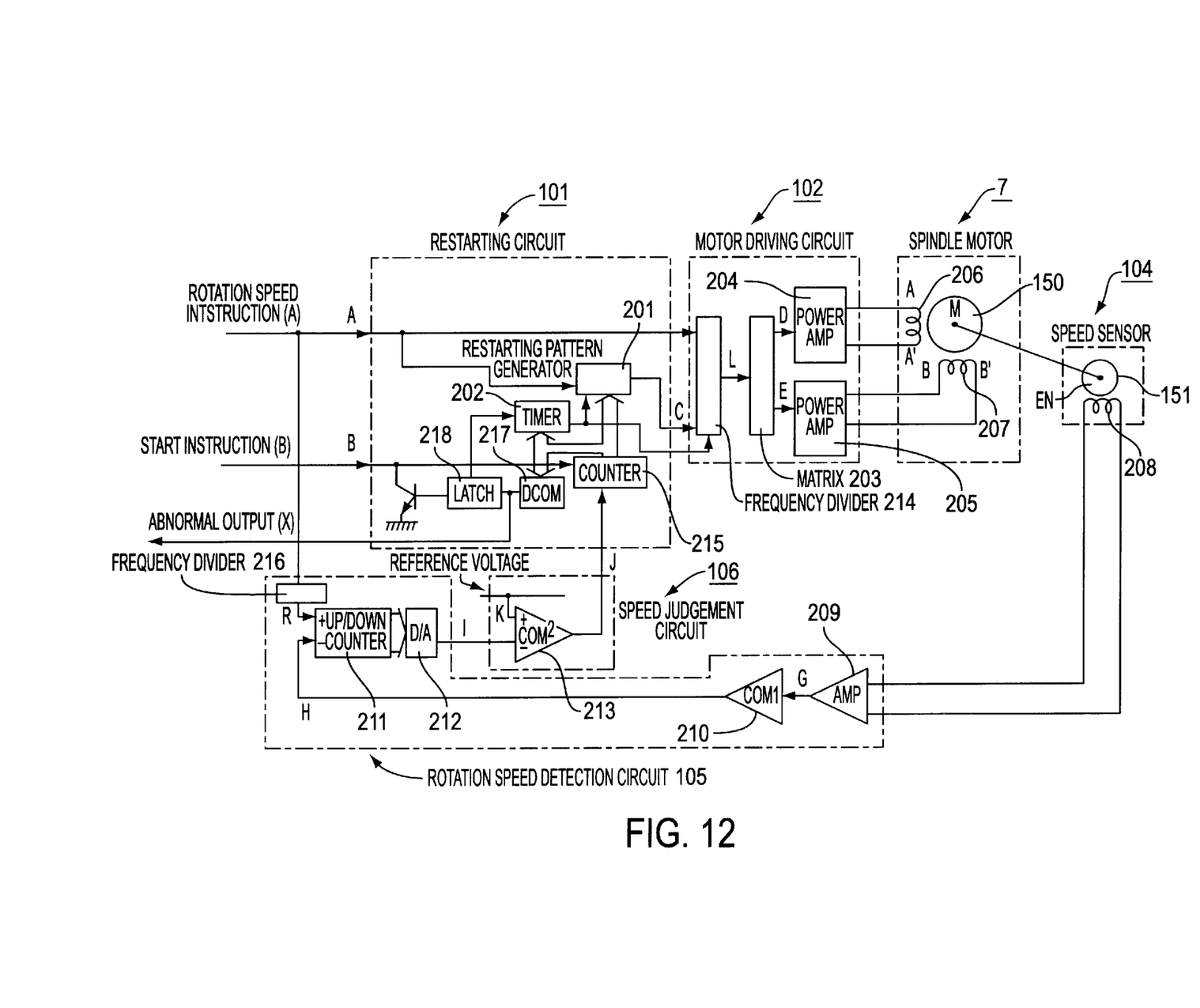
FIG. 12 is a block diagram showing the fourth embodiment of this invention.

Finally, the fourth embodiment will be shown in FIG. 12. Like the embodiment shown in FIG. 9 (the second embodiment), the embodiment shown in FIG. 12 represents a configuration involving a plurality of (four) frequency patterns for restarting. The embodiment shown in FIG. 12 is characterized in that it adds the function of stopping the motor and that of outputting abnormality signals to the configuration of the embodiment shown in FIG. 9. Therefore, here a brief description will be given below only on the added part.

FIG. 12 shows a configuration wherein a digital comparator 217, a latch circuit 218 and a transistor 219 are added to the restarting circuit 101 shown in FIG. 9. Their functions are as follows. The digital comparator 217 checks the output of the counter 215 showing a high occurrence frequency of step-out (restarting), and when the value of the counter 215 reaches a certain level (set at the number 5 like in the second embodiment), the digital comparator 217 outputs an output pulse X as a result of the comparison (this pulse signal X is a signal showing that some mechanical trouble has developed in the driving system including the spindle motor after successive failures of restarting in response to four successive attempts to restart). Said output pulse X is latched by the latch circuit 218 and the transistor 219 is switched "OFF". This will forcibly reduce the starting instruction B to the "HIGH" position, and the excitation of the spindle motor will be forcibly switched "OFF".

As a result, the excitation of the motor is suspended and any abnormal rise in temperature of the motor can be prevented. On the other hand, the output pulse X of the digital comparator 217 is outputted outside to serve as an abnormality signal showing that some mechanical troubles have occurred. Incidentally, the number of such occurrences prior to the stoppage of excitation can be arbitrary set by using a set value of the digital comparator 217, and in this embodiment it is set at the number 5. However, the other number can be set in this invention.

As described above, Such a fatal problem is known that the motor occasionally steps out for some causes during the driving of the disk when a low-cost stepping motor (in particular a 2-phase clawpole-type stepping motor is advantageous) is used as a spindle motor of information recording devices such as floppy disk drives. According to this invention, the motor restarting circuit automatically goes into action and said motor can be restarted. Furthermore, the restarting pattern can be changed depending on the frequency of occurrences requiring restarting, which assures more reliable restarting of the motor. And in case of successive failures of restarting the motor following repeated attempts to restart, it is possible to inform the abnormality to the outside and prevent in advance any abnormal heating and burning of the motor. As a result, the reliability of the device can be greatly improved.

What is claimed is:

1. A stepping motor drive that starts and stops a stepping motor by providing start instructions and stop instructions to said motor and also provides rotation speed instructions to specify a rotation speed of the stepping motor, said stepping motor drive comprising:

a speed sensor that detects the rotation speed of the stepping motor;

means for detecting the rotation speed of the stepping motor from the sensor and a rotation speed comparison means serving as a means for comparing a difference of the rotation speed with a rated rotation speed;

speed determination means for outputting signals when the rotation speed of the stepping motor falls below a previously set reference speed; and a pull-in pattern generation means that automatically gradually increases a frequency of a motor drive circuit within a required time from a self-starting frequency peculiar for the stepping motor to a desired frequency in response to the output signals of the speed determination means.

2. A stepping motor drive according to claim 1, wherein the pull-in pattern generator contains a plurality of frequency patterns, with one of said frequency patterns being selected for generation.

3. A stepping motor drive according to claim 1 wherein the pull-in pattern generator generates a plurality of frequency patterns.

4. A stepping motor drive according to claim 1 wherein the speed determination means outputs signals indicating abnormalities when the output of the speed determination means exceeds a prescribed frequency per unit length of time.

5. A stepping motor drive according to claim 1 wherein an index sensor for detecting an absolute position of a rotor of the stepping motor is used as a speed sensing device in place of the speed sensor which detects the rotation speed of the motor.

6. A stepping motor drive according to claim 1, wherein the speed sensor is incorporated in the stepping motor drive.

7. A stepping motor drive according to claim 1 wherein the stepping motor comprises a 2-phase clawpole-type stepping motor.

8. A stepping motor drive according to claim 1 wherein the stepping motor is a spindle motor for a floppy disk drive (FDD).

9. A method of driving a stepping motor wherein start and stop instructions to start/stop the stepping motor and rotation speed instructions to specify the rotation speed of the stepping motor are provided externally, the method comprising:

detecting the rotation speed of the stepping motor from a speed sensor that detects the speed of said motor and comparing the rotation speed by comparing a difference of the rotation speed with a rated rotation speed;

restarting the stepping motor, when the rotation speed of the stepping motor declines to a level below the previously set reference speed, by using a restarting pattern chosen from a plurality of patterns which gradually increases a driving frequency of the stepping motor within a required time from a required pull-in frequency of the stepping motor to a desired frequency.

10. A driving method of the stepping motor according to claim 9 wherein the restarting patterns are switched when the rotation speed of the stepping motor deviates from the required rotation speed per unit length of time.

11. A driving method of the stepping motor according to claim 9 wherein signals indicating abnormalities are outputted when the rotation speed of the stepping motor deviates from the required rotation speed per unit length of time.

12. A driving method of the stepping motor according to claim 9 wherein the start instructions for restarting are suspended when the rotation speed of the stepping motor deviates from the required rotation speed per unit length of time.

13. A stepping motor drive according to claim 5, wherein the index sensor is incorporated in the stepping motor drive.

* * * * *